Sept. 19, 1967     H. J. MARCOUX ET AL     3,342,226
COLLAPSIBLE WORK TABLE
Filed April 29, 1966                                        3 Sheets-Sheet 1
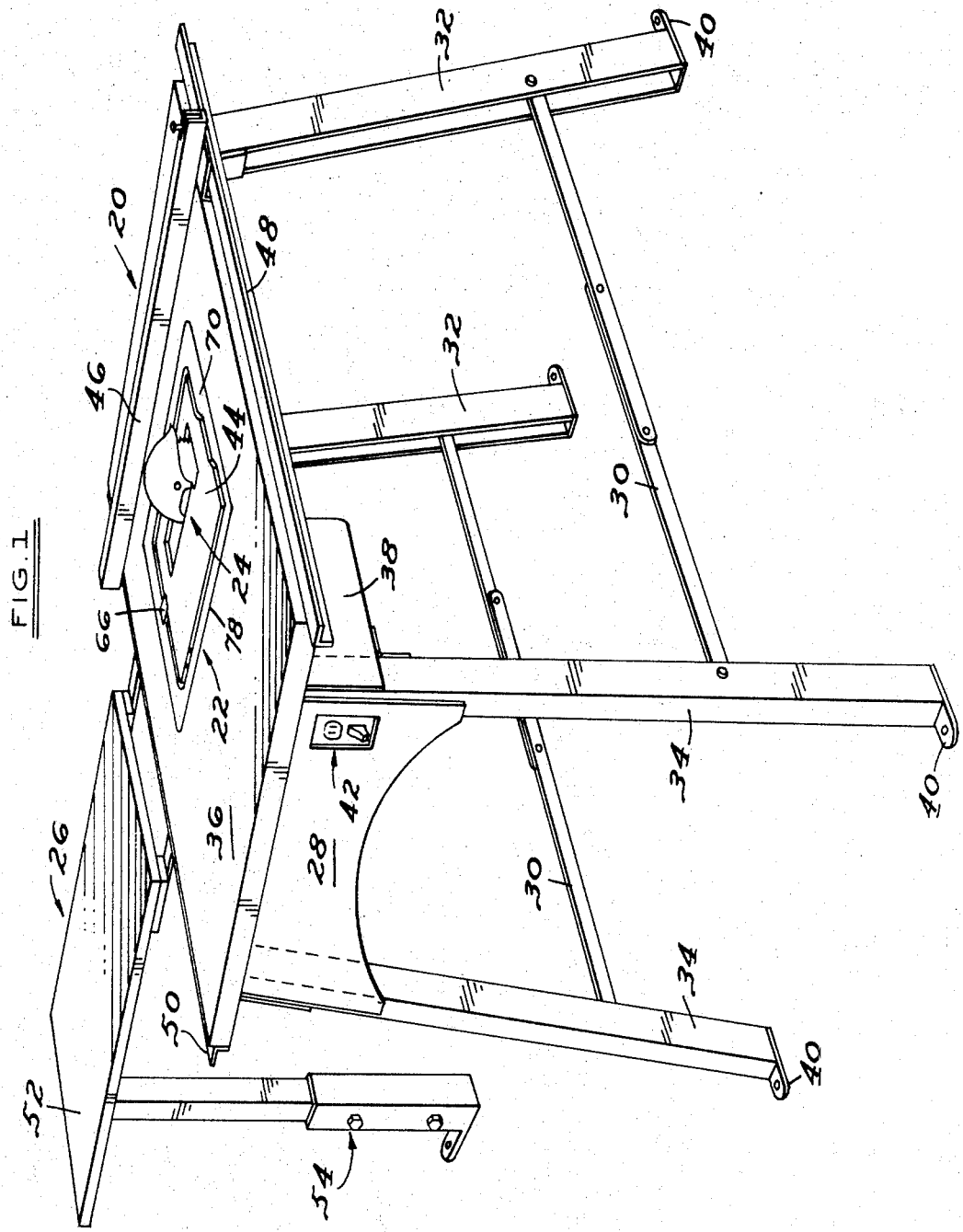
INVENTORS
HENRY J. MARCOUX
BERTRAND MARCOUX
BY
*Burton & Parker*
ATTORNEYS

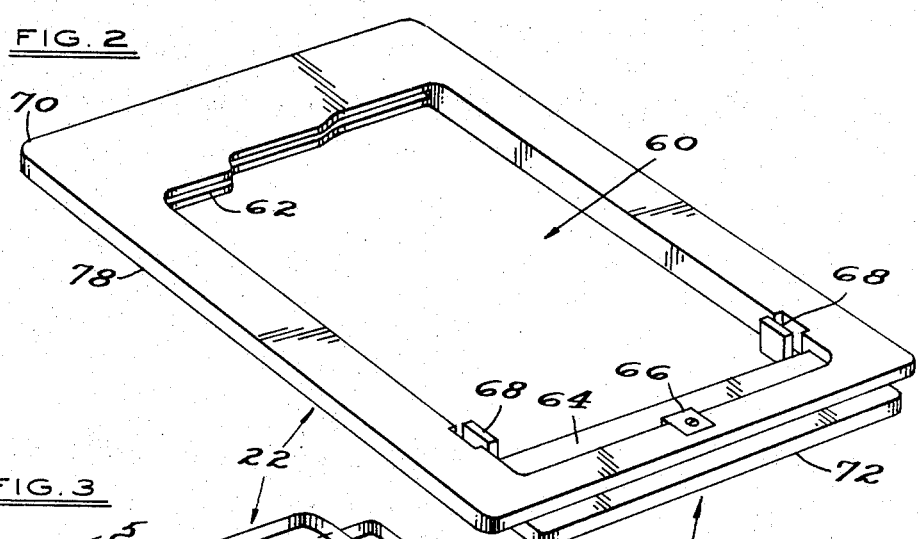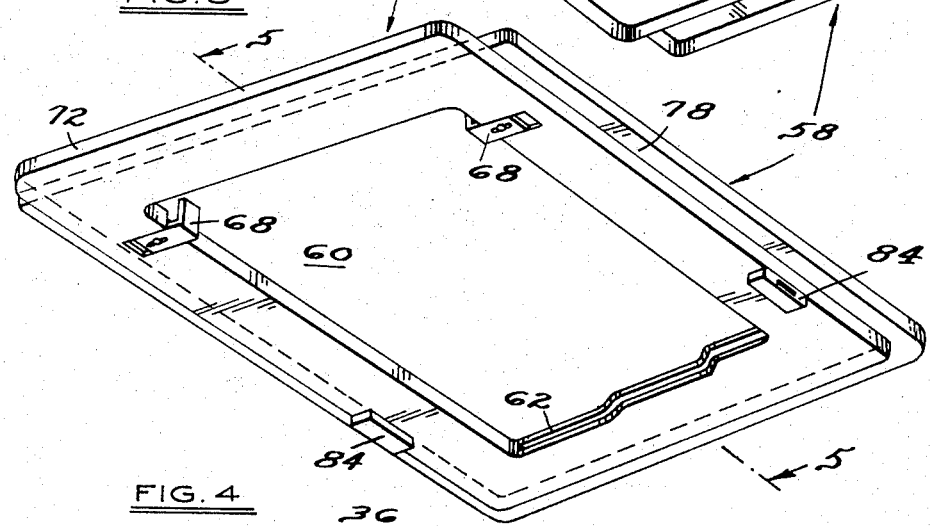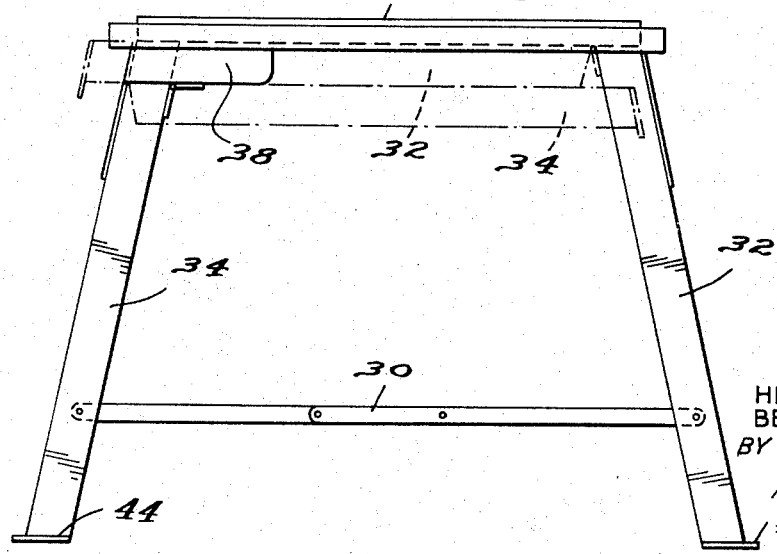

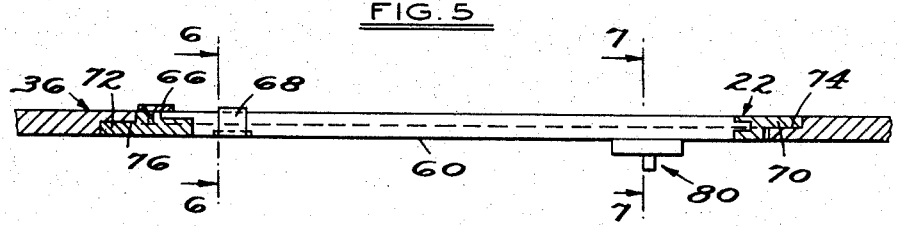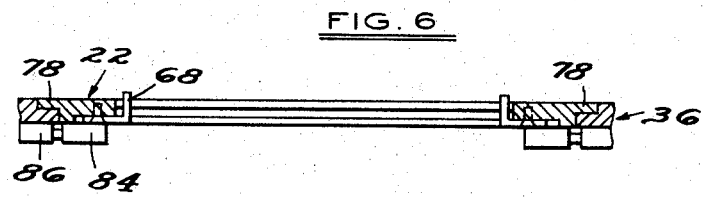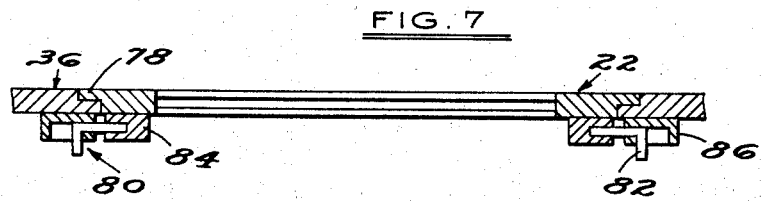

United States Patent Office 3,342,226
Patented Sept. 19, 1967

3,342,226
COLLAPSIBLE WORK TABLE
Henry J. Marcoux, 672 Chestnut, and Bertrand Marcoux,
931 3rd St., both of Wyandotte, Mich. 48192
Filed Apr. 29, 1966, Ser. No. 546,373
4 Claims. (Cl. 144—286)

This invention relates to supports for power tools, such as a circular saw, router, planer, and the like. This invention is particularly, although not exclusively adapted for use as a portable support for commercial use, such as might be used by a contractor or a commercial carpenter.

Portable power tool supports, which may be collapsed into a relatively compact unit, have not been widely accepted for commercial purposes for several reasons: First, there was no support or bench which would handle all of the various sizes and types of commercially available power tools and therefore the artisan was confronted with selecting a power tool based on whether there was available a portable support for it rather than on the basis of whether he liked the tool, and also, once having purchased a portable support he could not use it with other tools though other tools might be required at the construction site; in other words each tool heretofore required a separately designed bench to receive and support the tool; second, a commercial power tool support or workbench must be large enough to adequately support large articles for sawing and the like, and portable benches are generally not large enough for this purpose, or too bulky to actually be considered "portable"; further, commercial workbenches do not collapse sufficiently flat, or are too heavy or large to allow ready transportation. These inadequacies have long been apparent, however no satisfactory solution has yet been proposed.

My invention comprises an improved workbench having a configured aperture in the top which receives an adapter designed to receive and support a particular power tool, such as a circular saw, router, planer, sander, grinder, etc. The adapter serves as a frame for the tool, wherein the external portion of the adapter firmly seats in the bench aperture, and the inside surface provides a releasable support for the tool. An adapter may be provided for each of the various makes and sizes of power tools used by the contractor on site. Thus, a single bench may be used to support any of the various power tools used by a contractor.

The power tool support or workbench of this invention fully utilizes the advantages of the adapter described hereinabove. The bench is capable of folding flat while maintaining the requisite stability for commercial utilization. One pair of legs is hinged substantially at the plane of the table top, while the opposite pair are hinged about an axis spaced from the plane of the top, so that the first pair folds beneath the second pair of legs and avoids interference. The workbench is also provided with a novel extension, which does not add to the bulk of the folded unit, but provides the additional working surface area required for commercial purposes.

Other objects, advantages, and meritorious features of this invention will more fully appear from the following specification, claims and accompanying drawings wherein:

FIG. 1 is a side perspective view of one embodiment of the bench assembly of this invention;

FIG. 2 is a top perspective view of an adapter of this invention;

FIG. 3 is a bottom perspective view of the adapter of FIG. 2;

FIG. 4 is a side elevation of the workbench of this invention;

FIG. 5 is a cross sectional view of the bench top showing the adapter attachment;

FIG. 6 is a cross sectional view of FIG. 5 in the direction of view arrows 6—6; and FIG. 7 is a cross sectional view of FIG. 5 in the direction of view arrows 7—7.

Referring now to FIG. 1, the assembly comprises a collapsible bench, referred to generally at 20, an adapter referred to generally at 22, a commercial power tool referred to at 24, and a removable extension 26. The bench 20 has been designed to provide the optimum in portability without sacrificing the requirements of a commerical workbench. The opposed pair of legs may be secured together as shown by the brace 28. A collapsible brace 30 may be provided between opposed pairs of legs to add additional support. As shown in FIG. 4, one pair of legs 32 is hinged at the plane of the bench top 36, and the opposed pair of legs 34 are hinged about a support 38, spaced from the plane of the bench top. Thus, the first pair of legs 32 are able to fold beneath the second pair of legs 34 without interference, as shown in phantom in FIG. 4, and the bench folds completely flat. The legs may be provided with flanges 44 to bolt or nail the bench to the floor, and the brace 28 may be provided with an electrical outlet 42 for convenience in connecting the power tool 24 to an outlet.

The power tool shown in FIG. 1 at 24 is a conventional portable circular saw having the usual work-engaging plate 44. The plate is receivable in an adapter designed for the particular size and make of saw. In the embodiment shown in FIG. 1, the adapter 22 supports the saw plate 44 in the bench top. A conventional rip fence 46 may also be provided, which is slidably supported by ways 48 and 50.

To make the bench assembly more versatile in commerical applications, an extension 26 has been provided substantially in the axis of the saw cut. The extension has a top 52, in the same plane as the bench top 36, and a telescopic leg 54 which hingedly collapses to lie flat with the extension top. The extension may be secured to the bench in any conventional manner.

The adapter 22, which is best shown in FIGS. 2 and 3, has an external configuration, referred to generally at 58, designed to be seated in a configured aperture in the bench top, as will be described in relation to FIGS. 5 to 7. The adapter has an aperture 60 which is designed to receive and supprot a particular power tool required at the contractor's site. In the particular adapter emobdiment shown in FIGS. 2 and 3, a slot 62 receives an edge of the plate 44 of a conventional saw, and the opposite edge is supported on the ledge 64 and retained by the lock 66. Adjustment brackets 68 may be provided on opposite sides of the adapter aperture to center the power tool within the adapter.

It is to be understood that the particular adapter shown is merely by way of example, and the particular shape and size of the aperture 60 and the means by which the tool is held in the adapter may vary from tool to tool, an artisan having a plurality of tools would be provided with an adapter for each tool, and each adapter would fit the adapter receiving opening of the bench top 36.

In FIGS. 5 to 7 I have shown one embodiment of the attachment between the adapter 22 and the bench top 36. The cross section of FIG. 5 has been taken along the axis of the adapter 5—5 in FIG. 3. In this axis the adapter has an overhanging lip 70 at one end and an underhanging lip 72 at the opposite end, and these lips are received in complementary channels, 74 and 76, respectively, in the bench top 36. The sides of the adapter are provided with overhanging lips 78 which, with the lip 70, support the adapter within the bench top. FIG. 7 also shows an embodiment of a latch 80 which locks the adapter in place. The latch has an L-shaped lock member 82 which is received in a female member 84 on the adapter and is supported by 86 on the bench top. It is understood, however, that any form of latch well known by those skilled in the art may be used.

Modifications of my invention will occur to those skilled in the art, and it is understood therefore that this invention is not limited to the particular embodiment disclosed hereinabove, but that it is limited to cover all modifications which are within the purview of the appended claims.

What is claimed is:

1. A portable work bench, comprising: a top member having a configured opening including at least one underlying marginal edge portion, an adaptor frame received within said top member opening and supported on said marginal edge, said adaptor frame having a configured opening including at least one underlying marginal edge, said adaptor frame opening configured to receive and operably support a particular commercial power tool, a first locking means releasably locking said adaptor frame within said top member opening, and a second locking means adapted to releasably lock a power tool supported in said adpator frame opening.

2. The portable work bench defined in claim 1, characterized in that said bench includes a collapsible extension releasably secured to said top member which has a top portion in substantially the same plane as the top member of said bench, said extension having a single telescopic leg hingedly attached to the top portion of said extension to allow the extension to be folded flat.

3. The portable workbench defined in claim 1, characterized in that said workbench has two pair of legs, one said pair of legs being hingedly attached to said bench substantially in the plane of said top member, and the opposed pair of legs hingedly attached to said bench spaced from the plane of said top member to allow the first mentioned pair of legs to fold beneath the opposed pair of legs without interfering with the movement of said opposed pair of legs.

4. The portable workbench defined in claim 1, characterized in that said adapter frame includes centering means which adjustably center a power tool received within said adapter frame opening.

References Cited

UNITED STATES PATENTS

| | | | |
|---|---|---|---|
| 156,042 | 10/1874 | Salisbury | 144—286 |
| 1,178,597 | 9/1916 | Owens | 108—128 |
| 2,020,222 | 11/1935 | Tautz | 143—132 |
| 2,555,217 | 5/1951 | Young | 144—286 |
| 2,587,177 | 2/1952 | Larson | 144—286 |
| 2,615,479 | 10/1952 | Bearup | 144—132 X |
| 3,011,532 | 12/1961 | Williams | 144—132 X |
| 3,225,865 | 12/1965 | Downey | 144—286 |
| 3,229,735 | 1/1966 | Parmelee | 144—132 |

FOREIGN PATENTS

| | | |
|---|---|---|
| 763,280 | 12/1956 | Great Britain. |
| 512,260 | 1955 | Italy. |

WILLIAM W. DYER, JR., *Primary Examiner.*

R. J. ZLOTNIK, *Assistant Examiner.*